(12) United States Patent
Agrawal et al.

(10) Patent No.: US 7,010,520 B2
(45) Date of Patent: Mar. 7, 2006

(54) METHOD AND SYSTEM FOR SEARCHING DOCUMENTS WITH NUMBERS

(75) Inventors: Rakesh Agrawal, San Jose, CA (US); Ramakrishnan Srikant, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 10/134,406

(22) Filed: Apr. 26, 2002

(65) Prior Publication Data

US 2003/0204494 A1  Oct. 30, 2003

(51) Int. Cl.
G06F 17/30 (2006.01)
(52) U.S. Cl. ............... 707/3; 7/10; 709/203; 709/219
(58) Field of Classification Search ............... 707/3, 707/4, 5, 6, 1, 10, 104.1, 7; 709/203, 219
See application file for complete search history.

(56) References Cited

U.S. PATENT DOCUMENTS

| | | | | |
|---|---|---|---|---|
| 5,418,948 | A | 5/1995 | Turtle | 395/600 |
| 5,757,983 | A | 5/1998 | Kawaguchi et al. | 382/305 |
| 5,915,250 | A * | 6/1999 | Jain et al. | 707/100 |
| 6,038,560 | A | 3/2000 | Wical | 707/5 |
| 6,098,066 | A | 8/2000 | Snow et al. | 707/3 |
| 6,105,023 | A | 8/2000 | Callan | 707/5 |
| 6,175,829 | B1 | 1/2001 | Li et al. | 707/3 |
| 6,285,994 | B1 | 9/2001 | Bui et al. | 707/2 |
| 2001/0032200 | A1 * | 10/2001 | Greyvenstein | |
| 2002/0042791 | A1 * | 4/2002 | Smith et al. | |

FOREIGN PATENT DOCUMENTS

| | | |
|---|---|---|
| EP | 1 052 576 A2 | 4/2000 |
| WO | WO01/04802 A1 | 7/2000 |

OTHER PUBLICATIONS

Djamel Bouchaffra, Jean Guy Meunier, "A Markovian Random Field Approach to Information Retrieval", 1995 IEEE pp. 997-1002.
Arijit Sengupta, Andrew Dillon, "Query By Templates: A Generalized Approach for Visual Query Formulation for Text Dominated Databases", 1997 IEEE pp. 36-47.
Soumen Chakrabarti, "Data Mining for Hypertext: A Tutorial Survey", Jan. 2000 ACM SIGKDDT vol. 1D, Issue 2 pp. 1-11.
Nick Roussopoulos, Stephen Kelley, Frederic Vincent, "Nearest Neighbor Queries", 1995 ACM-SIGMOD Intl. Conf Procedings.
Ion Muslea, "Extraction Patterns for Information Extraction Tasks: A Survey", 1999 American Association for Artificial Intelligence.
Ronald Fagin, "Combining Fuzzy Information from Multiple Systems", 1996 J. Computer and System Sciences.
Kai Korpimies, Esko Ukkonen, "Term Weighting in Query-Based Document Clustering" , 1998 Advances in Databases and Information System pp. 151-153.

(Continued)

Primary Examiner—Leslie Wong
(74) Attorney, Agent, or Firm—John L. Rogitz

(57) ABSTRACT

A system and method for using numbers to query a corpus of documents, particularly but not exclusively for data spaces that have low reflectivity, i.e., for a point $x_i$ described by one or more numbers, the data space does not contain very many permutations of the numbers. For each document to be searched, each query number is matched with one and only one document number preferably using a bipartite graph or heuristic rule such that a distance function is minimized. The distance function can, but not must, take into account attribute names and unit names. A limiting algorithm can be used to limit the number of documents that must be searched.

43 Claims, 2 Drawing Sheets

OTHER PUBLICATIONS

Gwendolyn B. Moore, L.S. Michels, "Osi's High Speed Text Search System: A Hardware Approach to Full Text Searching", 1980 Communicating Information Proceedings of the 43rd ASIS Annual Meeting vol. 17, pp. 335-337.

Arturo Crespo, Jan Jannink, Erich Neuhold, Michael Rys, Rudi Studur, "A Survey of Semi-Automatic Extraction and Transformation", 1994 Information Systems pp. 1-19.

Ulrich Guntzer, Wolf-Tilo Balke, Werner KieBiling, "Optimizing Multi-Feature Queries for Image Databases" 2000 Proceedings for the 26th VLDB Conference.

Boris V. Cherkassky, Andrew V. Goldberg, Paul Martin, Joao C. Setubal, Jorge Stalfi, "Augment of Push? A Computational Study of Bopartile Matching and Unit Capacity Flow Algorithms", Mar. 1998 Technical Report #98-036R NEC Research Institute pp. 1-43.

Ronald Fagin, Amnon Lotem, Moni Naor, "Optimal Aggregation Algorithms for Middleware" 2001 ACM Symposium on Principles of Database Systems pp. 102-113.

Junghoo Cho, Sridhar Rajagopalan, "A Fast Regular Expression Indexing Engine", pp. 1-12.

Tomas Feden, Rajecv Motwani, "Clique Partitions, Graph Compression and Speeding-up Algorithms", Abstract pp. 1-21.

Surya Nepal, M.V. Ramakrishna, "Query Processing Issues In Image (multimedia) Databases", Abstract.

Cynthia Dwork, Ravi Kumar, Moni Naor, D. Sivakumar, "Rank Aggregation Method for the Web", 2001 WWW10 pp. 613-622.

Vipul Kashyap, Amit Sheth, "Semantic and Schematic Similarities Between Objects in Databases: A Context-based Approach", Abstract pp. 1-76.

"Searching with Numbers". Agrawal et al. WWW2002, May 7-11, 2002, Hawaii. ACM 1-58113-449-5/02/0005.

"A Markovian Random Field Approach to Information Retrieval". Bouchaffra et al. IEEE 0-8186-7128. pp. 997-1002. Sep., 1995.

"Query By Templates: A Generalized Approach for Visual Query Formulation for Text Dominated Databases". Sengupta et al. IEEE 1092-9959/97. pp. 36-47. 1997.

"Data mining for hypertext: A tutorial survey". Soumen Chakrabarti. ACM SIGKDD Explorations. vol. 1, Iss.2. pp. 1-11. Jan., 2000.

"Nearest Neighbor Queries". Roussopoulos et al. Proceedings of the 1995 ACM-SIGMOD Intl. Conf. on Management of Data, San Jose, CA.

"Extraction Patterns for Information Extraction Tasks: A Survey". Ion Muslea. American Association for Artficial Intelligence. 1999.

"Combining fuzzy information from multiple systems". Ronald Fagin. pp. 1-33. Proceedings Fifteenth ACM Symp. on Principles of Database Systems, Montreal, CA. 1996.

"Term Weighting in Query-Based Document Clustering". From Advances in Databases and Information Systems. Korpimies et al. Second East European Symp., ADBIS, Poland, Sep. 7-10, 1998.

OSI's High Speed Text Search System: A Hardware Approach to Full Text Searching. Moore et al. Proceedings of the 43rd ASIS Annual Meeting, Communicating Information, vol. 17, pp. 335-337. Anaheim, CA. Oct., 1980.

"A Survey Of Semi-Automatic Extraction and Transformation". Crespo et al. pps. 1-19. Information Systems, Great Britain, 1994.

"Optimizing Multi-Feature Queries for Image Databases". Guntzer et al. Proceedings of the 26th VLDB Conference, Cairo, Egypt, 2000.

"Augment or Push? A computational study of Bipartite Matching and Unit Capacity Flow Algorithms." Cherkassky et al. pp: 1-43. Technical report #98-036R, NEC Research Institute, Inc. Mar., 1998.

"Optimal Aggregation Algorithms for Middleware". Fagin et al. pp: 1-40. Proceedings of the 2oth ACM Symp. on Principles of Database Systems, 2001.

"A Fast Regular Expression Indexing Engine". Cho et al. pp. 419-430. Proceedings 18th Intl Conference on Data Engineering, Feb. 2002, San Jose, CA.

"Clique Partitions, Graph Compression and Speeding-up Algorithms". Feden et al. pp. 123-133. Proceedings of the 23rd ACM Symp. on Theory of Computing. 1991. And Journal of Computer and System Sciences, 51:261-272, 1995.

"Query Processing Issues in Image (multimedia) Databases". Nepal et al. pp. 22-29. Proceedings of the 15th Intl Conference on Data Engineering, Sydney, Australia, Mar. 1999.

"Semantic and Schematic Similarities Between Objects in Databases: A Context-Based Approach". Kashyap et al. VLDB Journal, 5(4): 276-304, 1996.

Navarro G: "Searching in Metic Spaces by Spatial Approximation" String Processing and Information Retreival Symposium, 1999 and International Workshop on Groupware Cancun, Mexico Sep. 22-24, 1999, Los Alamitos, Ca, USA, IEEE Comput. Soc. US, 141-148, XP010353487.

* cited by examiner

*MATCHING ALGORITHM*

METHOD AND SYSTEM FOR SEARCHING DOCUMENTS WITH NUMBERS

BACKGROUND OF THE INVENTION

1. Field of the Invention

The present invention relates to searching documents using numbers.

2. Description of the Related Art

A large fraction of data on the Web is numeric, yet current search techniques are actually quite primitive at searching for numbers. Essentially, if a person desires information on a numeric query, the person must enter exactly the number desired, because all current search engines do is treat numbers as character strings to find exact matches.

To illustrate the problem, consider the number 6798.32, which, when input to current search engines, correctly returns pages relating to the lunar nutation cycle, but when input as 6798.320 produces no page at all in response to the numeric query. As another example, consider a person who wants to find a specification sheet on a particular semiconductor device that has a set-up speed of 18 nanoseconds at a power rating of 495 mW. If the exact numeric values are provided many search engines can find matching character strings and thereby return a relevant page, but if the user can only supply approximate values, e.g., a query of "20 nanoseconds, 500 mW", current search engines are unable to return relevant pages. Unfortunately, it is often the case that a person knows only approximate values for numeric information he or she seeks, and thus is seldom helped by current search engines.

Roussopoulos et al., "Nearest Neighbor Queries", *Proc. of the 1995 ACM SIGMOD Int'l Conf. on Management of Data*, pp. 71–79 (1995) propose storing attribute-value pairs in a database so that queries can be executed against them and answered using nearest-neighbor techniques. Unfortunately, as recognized herein such solutions do not adequately address the problem of searching with numbers, because very often different documents refer to the same attribute by different names, making it difficult at best to establish correspondences between attribute names and values. Indeed, the major content companies in the electronics industry employ a host of people to manually extract such parametric information. The present invention recognizes, however, that it is not necessary to establish exact correspondences between attribute names and numbers, or indeed to specify attribute names at all, but only numeric queries that approximate desired values, and still produce meaningful query results.

SUMMARY OF THE INVENTION

The invention is a general purpose computer programmed according to the inventive steps herein to search for documents using numeric queries. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein. The invention is also a computer-implemented method for undertaking the acts disclosed below.

Accordingly, a computer-implemented method is disclosed for searching documents, with the method including receiving a query that has at least one query number $q_i$ but that does not necessarily specify an attribute name or unit for the query number. For documents to be searched, each query number $q_i$ is matched with at most one document number $n_m$ and vice-versa, with each document number being a number contained in the document or infinity, such that a distance score is minimized. Based on the distance scores, the method returns at least one document in response to the query.

In a preferred non-limiting embodiment, the distance score is derived from a distance function that may require, as input, only numbers. However, if desired the distance function may also account for attribute names and/or units that might be associated with the query numbers.

The matching of query numbers to document numbers can be undertaken using a bipartite graph or using heuristic rules or by other means.

In a preferred implementation, the method can also include limiting the number of documents that are processed using lower bounds on the distance scores. In this implementation, the method can process the documents to support database access and index access and can create, for each query number $q_i$, an ordered list $L_i$ of document numbers n. Round-robin access on the lists $L_i$ can be performed. When a document D is detected in a list, a database access for the document is executed and the document numbers matched as described above. The round-robin access is halted when a number of documents have been detected having distance scores less than a threshold value $\tau$.

In another aspect, a computer is programmed with instructions for retrieving numbers from a corpus of documents. The instructions include, in response to a numeric query containing at least one numeric query string that is not necessarily associated with an attribute name or unit name, accessing at least some documents in the corpus. The instructions further include comparing each numeric query string with one or more document strings. Each numeric query string is associated with one and only one document string to optimize at least one distance function, with documents being returned based thereon.

In yet another aspect, a computer program device has computer readable code thereon for searching a set of documents. The code includes means for receiving a user query including at least one query number corresponding to respective desired attribute values. The query does not necessarily include attribute names or unit names. Means return documents with values close to the query number, using only the query number.

In still another aspect, a computer for searching a set of unstructured documents (e.g., Web pages, specification sheets) and/or semi-structured documents (e.g., spreadsheets with column labels or text documents with variations in style or formatting) and/or structured documents (e.g., database tables including those that have been converted to XML) includes instructions for receiving a user query consisting of a set of numbers corresponding to desired attribute values, and also consisting of respective attribute names of the numbers. Instructions are provided for returning documents containing document values close to the set of numbers in the query using the query numbers and attribute names.

In another aspect, a computer-implemented method for searching a set of documents in response to a user query including a set of query numbers corresponding to desired attribute values together with units of the values includes returning documents with values approximating the set of query numbers, using the query numbers and units.

In yet another aspect, a system for searching a set of documents includes means for receiving a query comprising at least one query number, at least one unit of the query number, and at least one attribute name associated with the query number. Means are provided for returning documents with at least one document value approximating the query number, using the query number, the attribute name, and the unit.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
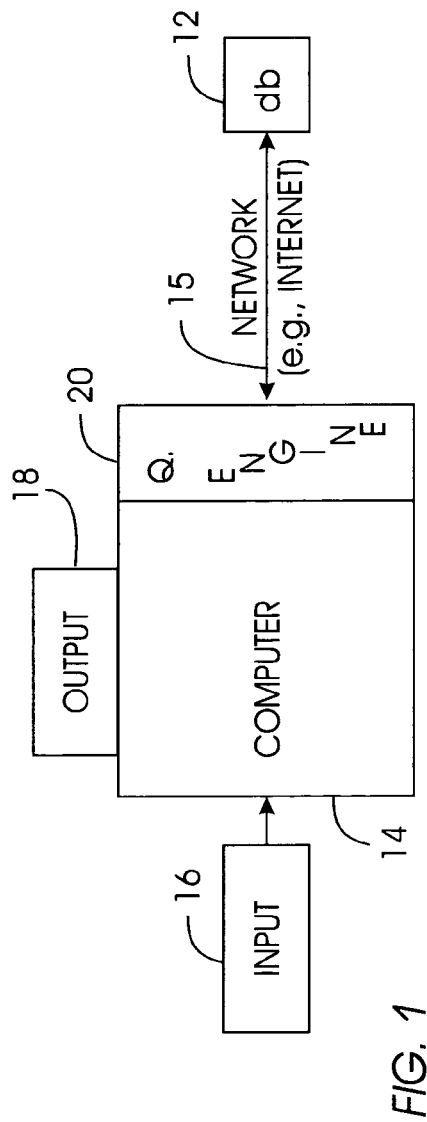
FIG. 1 is a block diagram of the present system architecture.

Referring initially to FIG. 1, a system is shown, generally designated 10, for searching documents, including unstructured and semi-structured documents, in one or more databases 12 (only a single database 12 shown for clarity) using numeric queries. A computer 14 for executing the queries accesses the database 12 over a network 15. The network 15 can be the Internet. The computer 14 can include an input device 16, such as a keyboard or mouse, for inputting data to the computer 14, as well as an output device 18, such as a monitor. The computer 14 can be a personal computer made by International Business Machines Corporation (IBM) of Armonk, N.Y. that can have, by way of non-limiting example, a 933 MHz Pentium ® III processor with 512 MB of memory. Other digital processors, however, may be used, such as a laptop computer, mainframe computer, palmtop computer, personal assistant, or any other suitable processing apparatus such as but not limited to a Sun® Hotspot™ server. Likewise, other input devices, including keypads, trackballs, and voice recognition devices can be used, as can other output devices, such as printers, other computers or data storage devices, and computer networks.

In any case, the processor of the computer 14 accesses a query module 20 to undertake certain of the logic of the present invention. The module 20 may be executed by a processor as a series of computer-executable instructions. The instructions may be contained on a data storage device with a computer readable medium, such as a computer diskette having a computer usable medium with code elements stored thereon. Or, the instructions may be stored on random access memory (RAM) of the computer 14, on a DASD array, or on magnetic tape, conventional hard disk drive, electronic read-only memory, optical storage device, or other appropriate data storage device. In an illustrative embodiment of the invention, the computer-executable instructions may be lines of C++ code or JAVA.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Figure 2:
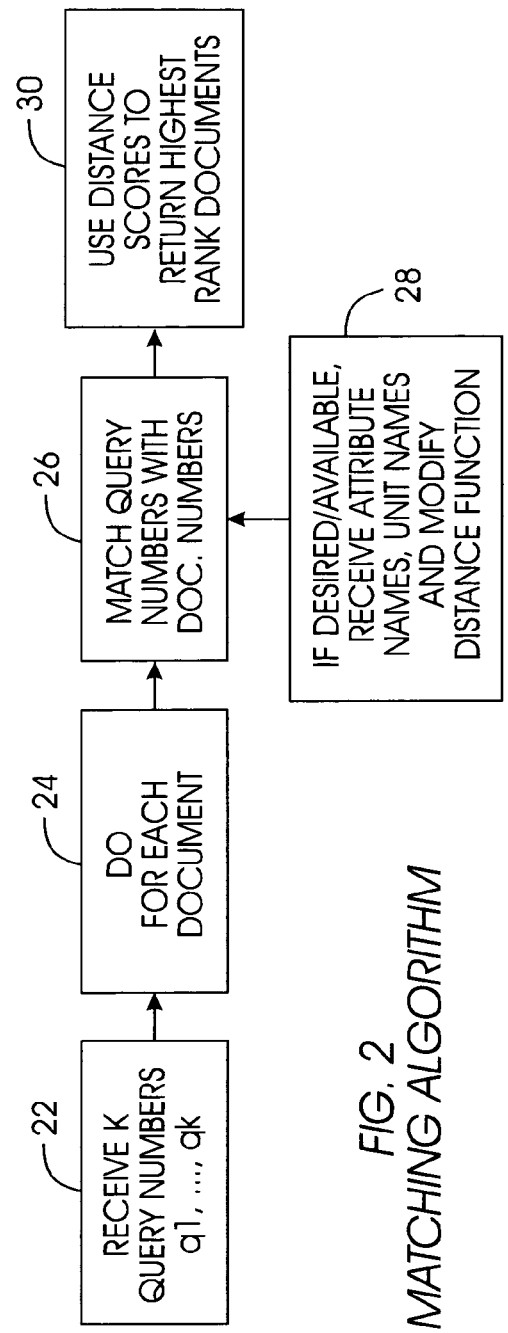
FIG. 2 is a flow chart of the preferred document matching logic.

Now referring to FIG. 2, the query-document matching logic of the present invention can be seen. It is to be understood that the present logic works best, but not necessarily exclusively, with data spaces that exhibit low reflectivity, i.e., that, for a point $x_i$ in the data space that is described by one or more numbers, the data space does not contain very many permutations of the numbers. For example, assume computer memory capacity in a data space typically has values of 32, 64, 126, 256, or 512 megabytes, and further assume that disk space has values of that might appear in the same space of 10, 20, or 30 gigabytes. Under this hypothetical, the only area that might result in confusion if the axes were overlaid on each other or exchanged is that the memory value of "32" might be confused as being close to the disk space value of "30".

More formally, for a set D of m-dimensional points $x_i$ (having numeric coordinates vector $n_i$), if θ(vector $n_i$) is the number of points within a distance r in m-dimensional space and ρ(vector $n_i$) is the number of points in D that have at least one reflection within a distance r of vector $n_i$, then the m,r-reflectivity of D is 1−{[1/|D|] (summation over all $x_i$)θ (vector $n_i$)/ρ(vector $n_i$)}. More generally, for a k-dimensional subspace S of D, vector $n_i^S$ represents the coordinates of point $x_i$ projected onto the subspace S, θ(S, vector $n_i^S$) is the number of points in D whose projections onto the subspace S are within a distance r of vector $n_i^S$ in k-dimensional space, and ρ(S, vector $n_i^S$) is the number of points in D that have at least one k-reflection within a distance r of vector $n_i^S$, then the S,r-reflectivity is 1−{[1/|D|] (summation over all $x_i$ in D)θ(S, vector $n_i^S$)/ρ(S, vector $n_i^S$)}, and the reflectivity of D for N k-dimensional subspaces S is 1/N [{summation over all S} Reflectivity (S,r)]. Low reflectivity data spaces are preferred but not essential.

Figure 3:
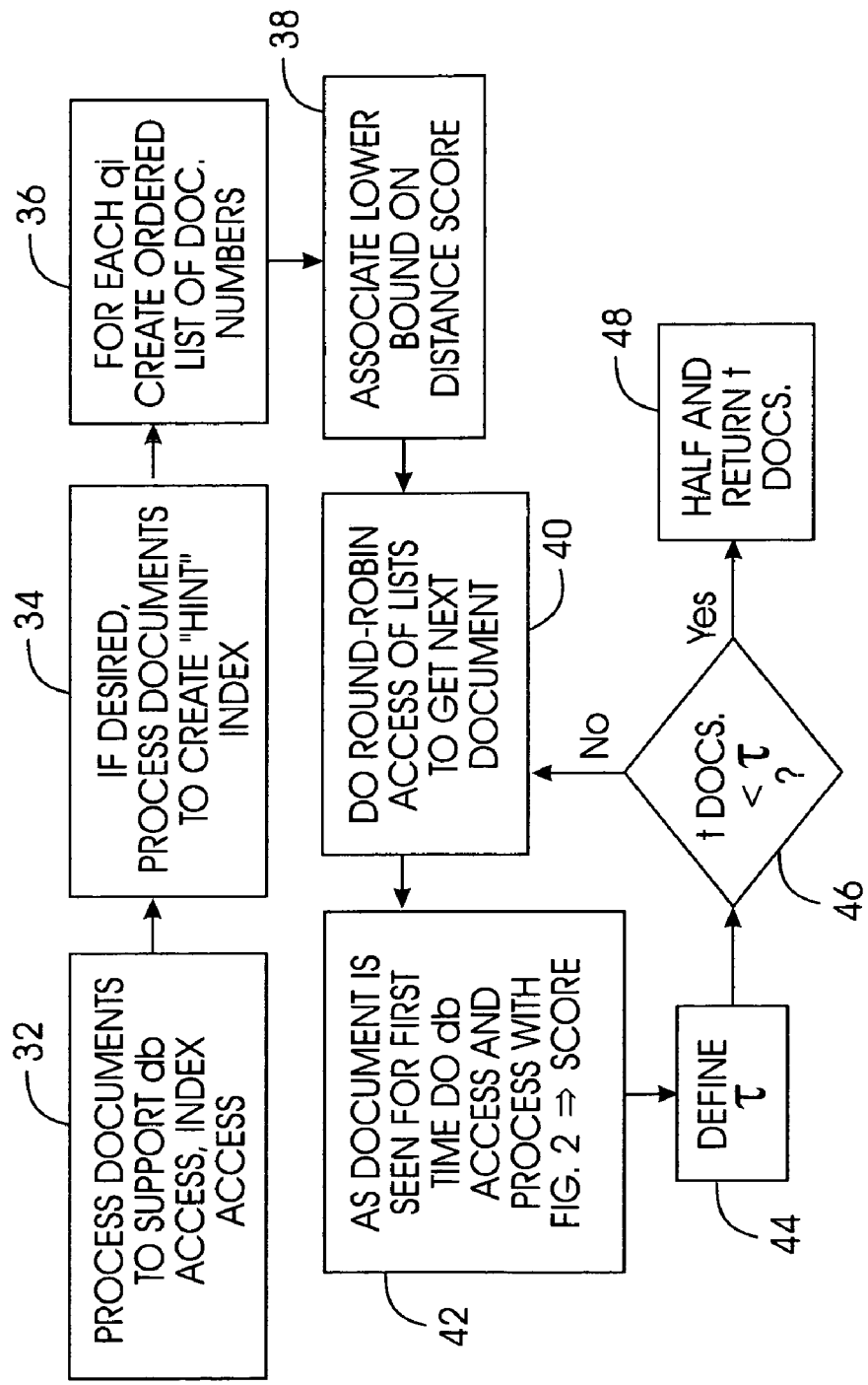
FIG. 3 is a flow chart of the logic for limiting the set of the documents that are to be matched.

Commencing at block 22, k query numbers $q_1, \ldots, q_k$ are received. By "number" is meant a string of one or more numerals. Moving to block 24, for each document D to be tested (default, without the logic of FIG. 3, is to test all documents in the data space), a DO loop is entered. Block 26 indicates that if desired and if they are available, attribute and unit names that are associated with the sought-after numbers can, but not must, be received to modify the distance function set forth further below.

At block 28, each query number is matched with a document number "n" such that a distance score generated by a distance function, such as the preferred, non-limiting function set forth below, is minimized. Preferably, each query number is matched with one and only one document number, and each document number likewise preferably is matched with one and only one query number. In the case where the number of query numbers is greater than the number of numeric strings in the document, some query numbers can be matched with infinity in accordance with the disclosure below, which means that the score for that document will be infinity and consequently that the document is highly unlikely to be returned in the results set.

This process is repeated for each document to be tested, and the highest ranking documents are returned at block 30.

One non-limiting distance function F is given as follows:
$F(Q,D) = ([\text{summation of i from 1 to k}] w(q_i, n_{ji})^p)^{1/p}$,
wherein D is a document that includes m numbers $n_i$, Q is a query that includes k numbers $q_1, \ldots, q_k$ such that there is a set of matching document numbers $n_{j1}, \ldots, n_{jk}$ in the $j^{th}$ document, $w(q_i, n_{ji})$ is the distance between $q_i$ $n_{ji}$, and F (Q,D) consequently is the distance score output by the distance function F with the $L_p$ norm ($1 \leq p \leq \text{infinity}$).

In the preferred, non-limiting embodiment the above logic is undertaken by constructing a weighted bipartite graph having k source vertices labelled $q_1, \ldots, q_k$, corresponding to the k number strings in the query, and m target vertices labelled $n_1, \ldots, n_m$, corresponding to the m number strings in the document. If there are more query numbers than document numbers (i.e., m<k), (k−m) target vertices are added with values of infinity. Then, from each source vertex an edge is constructed to the k closest target vertices and assigned a weight $w(q_i, n_j)^p$, wherein $w(q_i, n_j)$ is assumed to be $|q_i−n_j|/|q_i+\epsilon|$, wherein $\epsilon$ is a user-defined bound. The edge weights resulting in the lowest distance score are used to define the one-to-one matching between each source vertex (query number) and a corresponding target vertex (document number). If desired, however, heuristic algorithms, i.e., dynamic programming, can be used as set forth further below.

When attribute names and, in some cases, unit names as well are available, the above distance function becomes:

$$F(Q,D)=([\text{summation of i from 1 to } k]w(q_i,n_{ji})^p+[B\times v(A_i, H_{ji})^p]+[B^u\times u(A_i^u, H_{ji}^u)^p])^{1/p},$$

wherein $H_i$ is the set of attribute names associated with the number $n_i$, $A_i$ is the set of attribute names associated with the query number $q_i$, $v(A_i, H_{ji})$ is a function that determines the distance between set of attribute names associated with the query number and the set of attribute names associated with the document number (preferably, but not necessarily, equal to 0 if $A_i \cap H_j \neq \phi$ or if $A_i = \phi$ and 1 otherwise), B is a user-defined parameter that balances the importance between the match on the numbers and the match on the attribute names, $H_j^u$ is the set of unit names associated with the number $n_j$, $A_i^u$ is the set of unit names associated with the query number $q_i$, $u(A_i^u, H_j^u)$ is a function that determines the distance between the two sets, and $B^u$ is a user-defined parameter that balances the importance between the match on the numbers and the match on the unit names.

"B" can be determined as follows. Suppose a web site provides enough summary with each answer that the user is likely to click on relevant answers. By tracking clicks, a set of queries can be obtained for which the true answers (with high probability) are known. This set can be used to "tune" the algorithm above by using different values for B and selecting the one that yields the highest accuracy against the tune set. A tune set per query size might be required. Additionally, in the presence of a "hint" such as attribute names, the weight of edge $(q_i, n_j)$ in the bipartite graph become $w(q_i, n_j)^p+B\times v(A_i, H_j)^p$.

FIG. 3 shows the logic that can be used if desired to limit the number of documents that must be processed. Commencing at block 32, the documents are processed to support database access for each document (wherein given a document ID, the multi-set of numbers present in the document are returned), and index access, (wherein given a number, the set of documents having that number is returned). For index access, the numbers are kept sorted and a B-tree can be used if desired if the index becomes excessively large.

Moreover, block 34 indicates that if desired, the documents can be further processed to account for "hints", i.e., for the presence of attribute and/or unit names, wherein a hint access index is created such that, given a number together with, e.g., its attribute name, the set of documents is returned in which the number is present and the number's attribute name (in the document) is included in the set of attribute names associated with the number.

Moving to block 36, for each query number $q_i$ an ordered list is created of document numbers $n_i^1, n_i^2, \ldots$ such that $w(q_i, n_i^j) \leq w(q_i, n_i^{j+1})$. At block 38, a lower bound $s_i^j$ on the distance between $q_i$ and $n_i^j$ is associated with every document returned by index access on $n_i^j$. A list $L_i$ for the query number $q_i$ is defined to be the documents obtained from index lookup of $n_i^1, n_i^2, \ldots$ sorted in ascending value of score, lowest score first. These lists need not be materially realized.

In the case where "hints" are present, the operation at block 38 is modified as follows.

Assume that at least one attribute name $a_i$ is available for a document number $n_i$. For each query term $q_i$, an ordered list $<n^1,a_i^1>, <n_i^2,a_i^2>, \ldots$ is created and a score $s_i^j$ associated with the entry $<n_i^j,a_i^j>$ such that $s^j \leq s_i^{j+1}$, wherein $s_i^j=w(q_i, n_{ji})^p+[B\times v(A_i, a_i^j)^p]$. This can be done efficiently by using hint access for each attribute name in the set of "hints" (in this case, attribute names $A_i$) associated with the query term $q_i$, and also for the empty attribute name $\phi$.

Moving to block 40, a round-robin access to each of the k sorted lists L is executed.

Moving to block 42 for each iteration in the round-robin, as a document D is seen in a list, a database access is executed for the document and the document is processed in accordance with the logic of FIG. 2 to render a document distance score F(Q,D).

Next proceeding to block 44, assume $n_i'$ is the number last looked at from the index for the query number $q_i$. A threshold value $\tau$, is defined. Moving to decision diamond 46, it is determined whether t documents have been discovered with scores less than the threshold value $\tau$. If so, the round-robin is halted at block 48 and those documents having distance scores less than $\tau$ are returned, if they haven't been already, as the results set. If the test at decision diamond 46 is negative the logic loops back to block 40 to retrieve the next document in the round-robin for test.

In one non-limiting embodiment, the threshold value $\tau$ can be defined to be $([\text{summation of i from 1 to k}] w(q_i, n_i')^p)^{1/p}$. At this point, for any document that has not been seen in the index, the closest number to each query term $q_i$ must be at least as far from $q_i$ as is $n_i'$, and hence the distance between the document and the query must be at least as high as the threshold value $\tau$.

Note that the $s_i$ score is the lower bound on the distance between query and document numbers, not necessarily the actual distance.

When "hints", e.g., attribute names, are present, the threshold value $\tau$ can be defined to be $([\text{summation of i from 1 to k}] w(q_i, n_i')^p)+[B\times v(A_i, a_i')^p]^{1/p}$, wherein $n_i'$, $a_i'$ is the entry in the index last looked at for the query term $q_i$.

As mentioned above, while the use of a bipartite graph is one method for matching query numbers to document numbers, the present invention is not necessarily limited to a single method. For example, a fast heuristic that obtains good matching by exploiting the fact that the user query is likely to contain a small number of terms is given below.

First, in an off-line pre-processing step, the numbers present in a document can be sorted and saved. This pre-processing can be performed for every document in the database. Upon receipt of one or more query numbers, the query numbers are sorted at run-time. For query numbers that match document numbers, the two sorted lists are traversed, making greedy best assignments for each query number.

If the size of the document space is large, a binary search can be performed within the sorted document numbers to locate the closest match for each query number, and then a scan to either side can be executed if that number has already been matched with an earlier query number. To reduce execution time, the index of the last free value before the current match can be recorded.

While the particular METHOD AND SYSTEM FOR SEARCHING DOCUMENTS WITH NUMBERS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

No claim element herein is to be construed under the provisions of 35 U.S.C. §112, sixth paragraph, unless the element is expressly recited using the phrase "means for" or, in the case of a method claim, the element is recited as a "step" instead of an "act".

The invention claimed is:

1. A computer-implemented method for searching documents comprising:
   receiving a query having at least one query number $q_i$ but not necessarily specifying an attribute name or unit for the query number the query number $q_i$ being only an approximation of a desired attribute numeric value;
   for at least one document, matching each number $q_i$ with a document number $n_m$, each document number being a number contained in the document, such that a distance score is minimized; and
   based on the distance scores, returning at least one document in response to the query wherein the documents are selected from a set of documents, and the method further comprises limiting the number of documents in the set that are processed in the matching act using at least one lower bound on at least one distance score.

2. The method of claim 1, wherein the documents are accessible on the Internet.

3. The method of claim 1, wherein the distance score is derived from a distance function.

4. The method of claim 3, wherein the distance function requires, as input, only numbers.

5. The method of claim 3, wherein the distance functions accounts for at least one attribute name associated with at least one query number.

6. The method of claim 3, wherein the distance function accounts for at least one unit name associated with at least one number.

7. The method of claim 5, wherein the distance function accounts for at least one unit name associated with at least one number.

8. The method of claim 3, wherein each document number matches at most one query number, and the distance score of a first document is infinity if more query numbers exist than document numbers in the first document.

9. The method of claim 1, comprising processing the documents in the set of documents to support database access and index access.

10. The method of claim 9, wherein the index access supports hint access.

11. The method of claim 9, comprising creating, for each query number $q_i$, an ordered list $L_i$ of document numbers n, each list being ordered in ascending order of distance scores.

12. The method of claim 11, comprising performing round-robin access on the lists $L_i$ and, when a document D is detected in a list, performing a database access for the document and undertaking the matching and returning acts.

13. The method of claim 12, comprising halting the act of performing a round-robin access when a number of documents have been detected having distance scores less than a threshold value $\tau$.

14. A computer programmed with instructions for retrieving numbers from a corpus of documents, the instructions comprising:
   in response to a numeric query containing at least one numeric query string not necessarily associated with an attribute name or unit name, accessing at least some documents in the corpus the string being only an approximation of a desired attribute numeric value;
   comparing each numeric query string with one or more document strings;
   associating each numeric query string with one and only one document string to optimize at least one distance function; and
   returning at least a portion of at least one document based on the associating instruction wherein the documents are selected from a set of documents, and the computer further comprises instructions for limiting the number of documents in the set that are processed using lower bounds on the distance scores.

15. The computer of claim 14, wherein the documents are accessible on the Internet.

16. The computer of claim 15, wherein at least one distance score is derived from the distance function.

17. The computer of claim 16, wherein the distance function requires, as input, only numbers.

18. The computer of claim 16, wherein the distance functions accounts for at least one attribute name associated with at least one query number.

19. The computer of claim 16, wherein the distance function accounts for at least one unit name associated with at least one number.

20. The computer of claim 18, wherein the distance function accounts for at least one unit name associated with at least one number.

21. The computer of claim 16, wherein the comparing and associating instructions use at least one bipartite graph.

22. The computer of claim 14, wherein the instructions comprise processing the documents in the set of documents to support database access and index access.

23. The computer of claim 22, wherein the index access supports hint access.

24. The computer of claim 22, wherein the instructions comprise creating, for each query number $q_i$, an ordered list $L_i$ of document numbers n, each list being ordered in ascending order of distance scores.

25. The computer of claim 24, wherein the instructions comprise performing round-robin access on the lists $L_i$ and, when a document D is detected in a list, performing a database access for the document and invoking the comparing and associating instructions.

26. The computer of claim 25, wherein the instructions include halting the round-robin access when a number of documents have been detected having distance scores less than a threshold value τ.

27. A computer program device having computer readable code thereon for searching a set of documents, the code comprising:
   means for receiving a user query including at least one query number corresponding to respective desired attribute numeric values, the query not necessarily including attribute names or unit names, the query including at least one numeric value that is only an approximation of a desired attribute numeric value; and
   means for returning documents with values close to the query number, wing only the query number wherein the means for returning includes means for returning a ranked list of documents, each document having a value associated with each query number, such that a distance function between the query numbers and corresponding values is minimized.

28. The computer program device of claim 27, wherein the means for returning uses bipartite graph matching.

29. The computer program device of claim 27, wherein the means for returning uses at least one heuristic rule.

30. The computer program device of claim 27, wherein the means for returning includes means for building a sorted index over all values in all documents to limit a set of matches between the document values and the query numbers.

31. A computer for searching a set of unstructured and/or semi-structured and/or structured documents, comprising:
   instructions for receiving a user query consisting of a set of numbers corresponding to desired attribute values and being only approximations of desired attribute numeric values, the query also consisting of respective attribute names of the numbers; and
   instructions for returning documents containing document values close to the set of numbers in the query using the query numbers and attribute names wherein the means for returning includes means for returning a ranked list of documents, each document having a value associated with each query number, such that a distance function between the query numbers and corresponding values is minimized.

32. The computer of claim 31, wherein the instructions for returning use bipartite graph matching.

33. The computer of claim 31, wherein the instructions for returning use at least one heuristic rule.

34. The computer of claim 31, wherein the instructions for returning include instructions for building a sorted index over all values in all documents to limit a set of matches between the document values and the query numbers.

35. A computer-implemented method for searching a set of documents in response to a user query including a set of query numbers corresponding to desired attribute values together with units of the values the query numbers being only approximations of desired attribute numeric values, comprising:
   returning documents with values approximating the set of query numbers, using the query numbers and units wherein the act of returning Includes returning a ranked list of documents, each document having at least one value associated with each query number, such that a distance function between the query numbers and corresponding values is minimized.

36. The method of claim 35, wherein the act of returning uses bipartite graph matching.

37. The method of claim 35, wherein the act of returning uses at least one heuristic rule.

38. The method of claim 35, wherein the act of returning includes building a sorted index over all values in all documents to limit a set of matches between the document values and the query numbers.

39. A system for searching a set of documents, comprising:
   means for receiving a query comprising at least one query number, at least one unit of the query number, and at least one attribute name associated with the query number the query number being an approximation of a desired attribute numeric value;
   means for returning documents with at least one document value approximating but not necessarily equalling the query number, using the query number, the attribute name, and the unit wherein the means for returning includes means for returning a ranked list of documents, each document having a value associated with each query number, such that a distance function between the query numbers and corresponding values is minimized.

40. The system of claim 39, wherein the means for returning uses bipartite graph matching.

41. The system of claim 39, wherein the means for returning uses at least one heuristic rule.

42. The system of claim 39, wherein the means for returning includes means for building a sorted index over all values in all documents to limit a set of matches between the document values and the query numbers.

43. The method of claim 8, wherein at least the act of matching is undertaken using at least one bipartite graph.

* * * * *